United States Patent
Dale et al.

(10) Patent No.: US 11,110,562 B2
(45) Date of Patent: Sep. 7, 2021

(54) MACHINE TOOL CHIP REMOVAL

(71) Applicant: Raytheon Company, Waltham, MA (US)

(72) Inventors: Erik T. Dale, Tucson, AZ (US); Paul D. Nowakowski, Tucson, AZ (US); Raymundo Blanco, Tucson, AZ (US)

(73) Assignee: 2865-15.7253.US.NP, Waltham, MA (US)

( * ) Notice: Subject to any disclaimer, the term of this patent is extended or adjusted under 35 U.S.C. 154(b) by 429 days.

(21) Appl. No.: 15/410,520

(22) Filed: Jan. 19, 2017

(65) Prior Publication Data
US 2018/0200853 A1 Jul. 19, 2018

(51) Int. Cl.
| | | |
|---|---|---|
| *B23Q 11/00* | (2006.01) | |
| *B05B 13/04* | (2006.01) | |
| *B05B 12/08* | (2006.01) | |
| *B05B 12/04* | (2006.01) | |
| *B05B 1/30* | (2006.01) | |

(Continued)

(52) U.S. Cl.
CPC ........ *B23Q 11/1015* (2013.01); *B05B 1/3006* (2013.01); *B05B 12/04* (2013.01);
(Continued)

(58) Field of Classification Search
CPC ........... B08B 3/02; B08B 5/02; B23Q 11/005; B23Q 11/1015; B23Q 11/0075;
(Continued)

(56) References Cited

U.S. PATENT DOCUMENTS 2,973,068 A * 2/1961 Sturrock ............. B25B 23/1453
173/178
6,059,702 A 5/2000 Winkler et al.
(Continued)

FOREIGN PATENT DOCUMENTS

| DE | 20301772 U1 | 2/2004 |
|---|---|---|
| DE | 202013100177 UI | 4/2014 |
| SU | 1140363 A | 4/1986 |

OTHER PUBLICATIONS

Ebay; Shell Mill Coolant Lock Screws Tighening Fixtures. KM Vise Mounts; http://www.ebay.com/itm/Valenite-PT-872-3-4-16-Coolant-Through-Facemill-Arbor-Screw-/140660853502; as accessed Oct. 6, 2016; 3 pages; San Jose, CA.
(Continued)

*Primary Examiner* — Douglas Lee

(57) ABSTRACT

A machine tool chip removal device including a coupling interface to couple with a rotatable spindle of a machine tool to facilitate rotation of the machine tool chip removal device about an axis at a rotational speed. The chip removal device can also include a main fluid channel with an opening to receive pressurized fluid from the machine tool. The chip removal device can further include a first fluid delivery channel and a second fluid delivery channel to direct fluid in different directions. Each fluid delivery channel can be in fluid communication with the main fluid channel. In addition, the chip removal device can include one or more valves associated with the first and second fluid delivery channels to selectively allow fluid passage from the main fluid channel to the fluid delivery channels. The one or more valves can be actuated by varying fluid pressure and/or rotational speed.

18 Claims, 3 Drawing Sheets

(51) Int. Cl.
  *B23Q 11/10* (2006.01)
  *B08B 3/02* (2006.01)
  *B08B 5/02* (2006.01)

(52) U.S. Cl.
  CPC .......... *B05B 12/08* (2013.01); *B05B 13/0421* (2013.01); *B08B 3/02* (2013.01); *B08B 5/02* (2013.01); *B23Q 11/005* (2013.01); *B23Q 11/0075* (2013.01); *B05B 1/302* (2013.01); *B23Q 2230/002* (2013.01)

(58) Field of Classification Search
  CPC ... B23Q 2230/002; B05B 12/04; B05B 12/08; B05B 13/0421; B05B 1/3006; B05B 1/302
  See application file for complete search history.

(56) References Cited

U.S. PATENT DOCUMENTS

| | | | |
|---|---|---|---|
| 2004/0045591 A1* | 3/2004 | Bauch | B05B 3/02 134/56 R |
| 2006/0120817 A1* | 6/2006 | Huang | B23Q 11/1084 409/137 |
| 2007/0145075 A1* | 6/2007 | Divisi | B23Q 11/1023 222/148 |
| 2012/0192904 A1* | 8/2012 | Francisco | E03B 7/07 134/186 |
| 2014/0197608 A1* | 7/2014 | Schneider | B23B 31/02 279/20 |
| 2015/0122340 A1* | 5/2015 | Edelmayer | F16K 15/04 137/12 |

OTHER PUBLICATIONS

Kennametal; Shell Mill Coolant Lock Screws Tighening Fixtures, KM Vise Mounts; http://www.kennametal.com/en/products/20478624/2664259/42041919/54478696/100023392.html; as accessed Oct. 6, 2016; 1 page; Pittsburgh, PA.

Practical Machinist; Thread: chip removal via coolant; http://www.practicalmachinist.com/vb/cnc-machining/chip-removal-via-coolant-234365/; as accessed Oct. 6, 2016; 4 pages.

International Search Report for International Application No. PCT/US2017/062564 dated Feb. 27, 2018, 12 pages.

* cited by examiner

MACHINE TOOL CHIP REMOVAL

BACKGROUND

Machine tools, such as mills and lathes, are commonly operated by computer numerical control (CNC) to manufacture a wide variety of parts. During machining operations, chips removed by cutting tools may be deposited on part surfaces or become trapped in recesses, such as channels, apertures, holes, etc. The presence of chips on parts surfaces can become problematic during manufacture, such as when a chip interferes with part inspection, which may be performed by a probe executing a program. Typically, chips are manually removed from part surfaces by operators using compressed air to blow chips off part surfaces.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
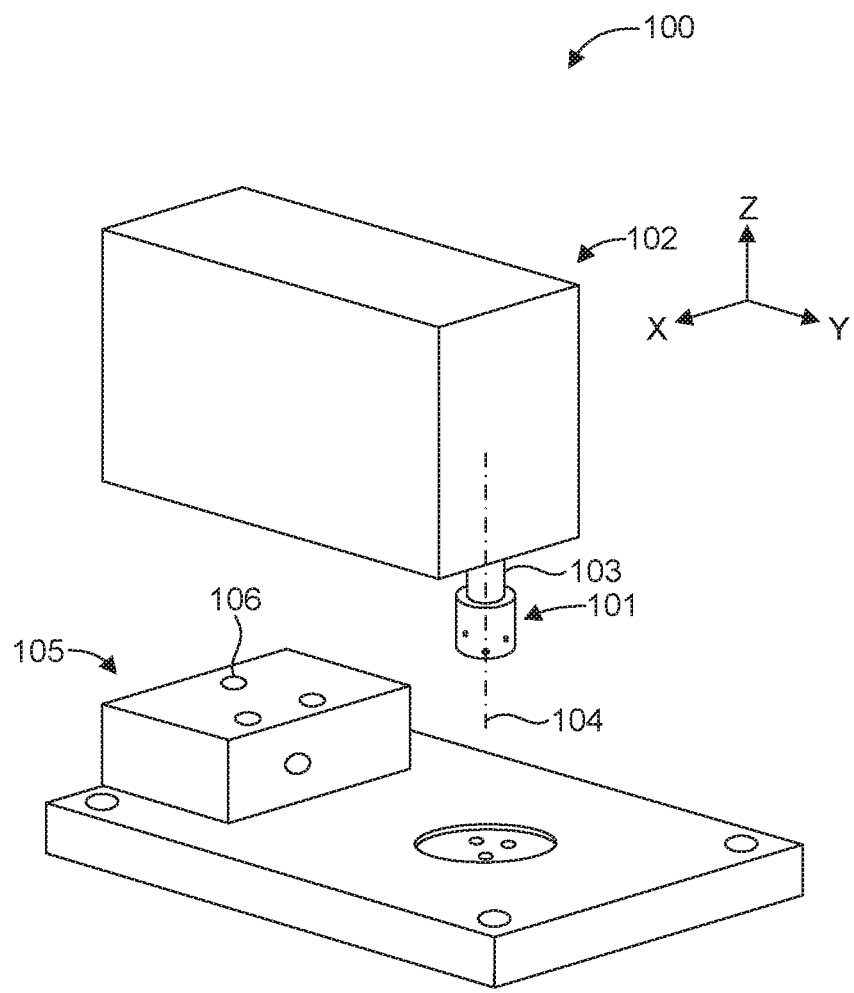
FIG. 1 is an illustration of a machine tool chip removal system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Although manual removal of chips from part surfaces is effective, such activities by the operator interrupt operations of part programs, such as inter-operational inspection probe routines, and therefore introduce process inefficiencies that add costs to part production. Manufacturing can therefore become more efficient by eliminating operator involvement in chip removal from part surfaces.

Accordingly, a machine tool chip removal device is disclosed that utilizes machine tool fluid supply (e.g., coolant) to provide an automated chip removal solution. In one aspect, fluid can be delivered in various directions to target desired part locations for chip removal. The chip removal device can include a coupling interface to couple with a rotatable spindle of a machine tool to facilitate rotation of the machine tool chip removal device about an axis at a rotational speed. The chip removal device can also include a main fluid channel with an opening to receive pressurized fluid from a source via the machine tool. The chip removal device can further include one or a plurality fluid delivery channels, such as a first fluid delivery channel and a second fluid delivery channel to direct fluid in different directions. Each fluid delivery channel can be in fluid communication with the main fluid channel. In addition, the chip removal device can include one or more valves associated with the first and second fluid delivery channels to selectively allow fluid passage from the main fluid channel to the fluid delivery channels. The one or more valves can be actuated by varying at least one of fluid pressure and rotational speed of the spindle. Furthermore, in some aspects, the angle of fluid delivery can be changed or varied or altered based on the rotational speed of the spindle.

In one aspect, a machine tool chip removal system is disclosed. The system can include a machine tool and a machine tool chip removal device operably coupled to the machine tool. The chip removal device can include a coupling interface to couple with a rotatable spindle of the machine tool to facilitate rotation of the machine tool chip removal device about an axis at a rotational speed. The chip removal device can also include a main fluid channel with an opening to receive pressurized fluid from the machine tool. The chip removal device can further include a first fluid delivery channel and a second fluid delivery channel to direct fluid in different directions. Each fluid delivery channel can be in fluid communication with the main fluid channel. Additionally, the chip removal device can include one or more valves associated with the first and second fluid delivery channels to selectively allow fluid passage from the main fluid channel to the fluid delivery channels. The one or more valves can be actuated by varying at least one of fluid pressure and rotational speed.

One embodiment of a machine tool chip removal system 100 is illustrated in FIG. 1. The system 100 can include a machine tool chip removal or blow-off device 101. The system 100 can also include a machine tool 102. The chip removal device 101 can be operably coupled to the machine tool 102 in any suitable manner, such as via a tool holder coupled to a spindle 103. The spindle 103 may be used to rotate the chip removal device 101 at any suitable rotational speed about an axis 104, which is typically measured in rotations per minute (RPM) of the spindle 103. The machine tool 102 can comprise any type of machine tool, such as a mill, a lathe, a machining center (that may include a mill and a lathe), etc. The machine tool 102 may provide the ability to machine a workpiece 105 in any number of axes. For the example, the machine tool 102 represents a milling machine that provides three-axis movement (e.g., translation in X, Y, and Z). In some cases, a milling machine may provide five-axis movement (e.g., translation in X, Y, and Z and rotation about X and Y).

In general, the chip removal device 101 can use pressurized liquid (e.g., coolant) or gas (e.g., air) directed out small openings to spray or blow chips from the surfaces, orifices, and holes of the workpiece 105. The chip removal device 101 can be utilized at any suitable time, such as after or between part machining and prior to executing an inspection (e.g., probing) routine or additional machining operations, which may be negatively affected by the presence of chips on the workpiece 105. Typically, the chip removal device 101 will use high pressure fluid supplied by the machine tool 102. Thus, in some embodiments, as discussed below, the chip removal device 101 can be configured to fit a standard through-spindle coolant (TSC) tool holder that is configured to couple with a spindle and provided high pressure coolant through the tool holder and tool while cutting.

In use, the chip removal device 101 can be positioned appropriately relative to the workpiece 105 and caused to direct fluid onto the workpiece 102, such as in a high-pressure "shower" manner, which clears chips from the surfaces of the workpiece 105. The operation of the chip removal device 101 is discussed in more detail below. Because the chip removal device 101 can be coupled to the spindle 103 of the machine tool 102, fluid can be provided to the chip removal device 101 at any suitable pressure and the operation of the chip removal device 101 can be controlled by a CNC program (e.g., one similarly used to create or machine the part, or a new or different one). In addition, the chip removal device 101 can be rotated about the axis 104 of the machine tool 102, which provides for control of rotation speed of the chip removal device 101 just as a cutter is controlled by CNC.

The chip removal device 101 can be moved or positioned about the workpiece 105 in any suitable manner to accomplish the chip removal objective. For example, the chip removal device 101 can be moved along a tool path about the workpiece 105 (e.g., rerun the tool path of the previous cutting tool, or run a custom tool path) while directing fluid onto the workpiece 105 to flush chips away. The attributes of the chip removal device 101 as disclose herein may be particularly suited to flushing out holes 106 (e.g., blind holes) in the workpiece 105 that are often troublesome and time-consuming to clean.

Figure 2:
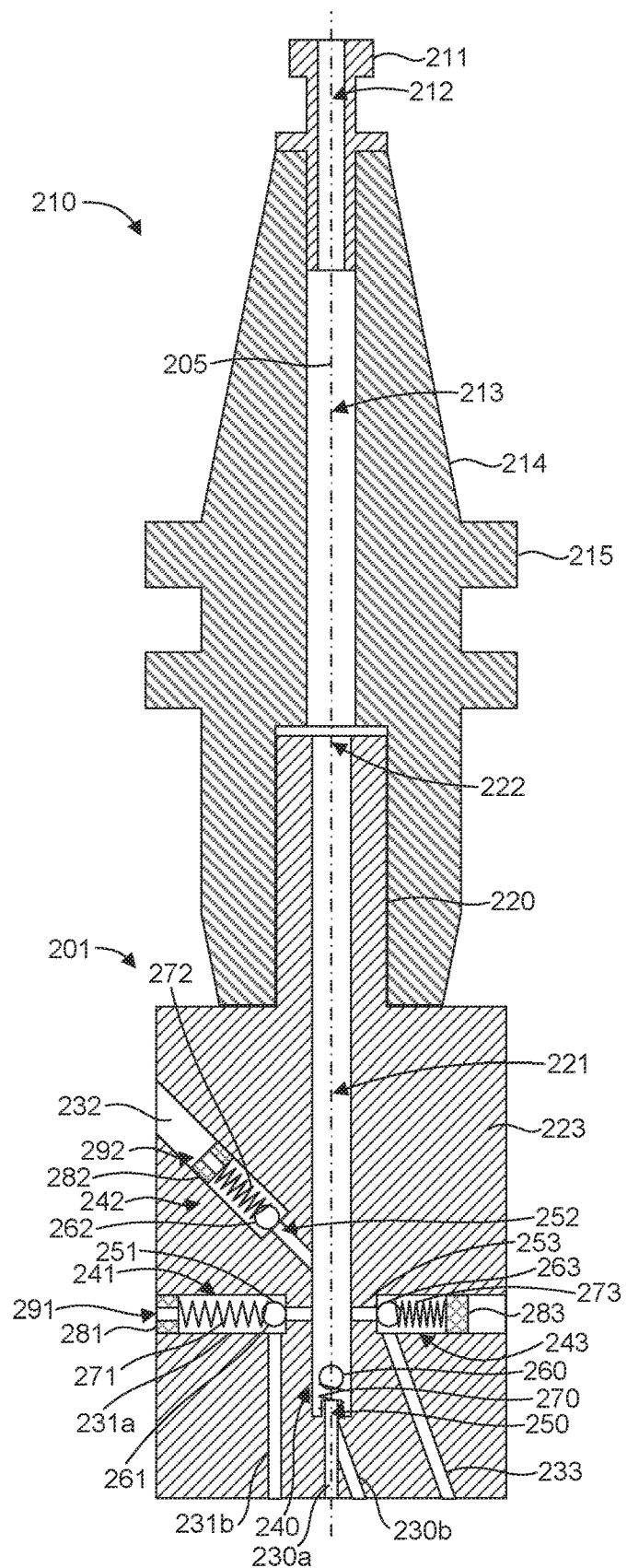
FIG. 2 is a cross-sectional illustration of a chip removal device in accordance with an example of the present disclosure coupled to a typical tool holder.

FIG. 2 illustrates a cross-section of a chip removal device 201 in accordance with an example of the present disclosure, coupled to a typical tool holder 210. The chip removal device 201 can include a coupling interface 220, such as a shank or other interfacing structure, to couple with a rotatable spindle of a machine tool. In this case, the chip removal device 201 can be coupled to a machine tool spindle via the tool holder 210 and can therefore be configured to interface with the tool holder 210. As mentioned above, the chip removal device 201 can receive pressurized fluid from the machine tool, such as through the spindle. The tool holder 210 can be of any suitable configuration to deliver pressurized fluid to a tool. The tool holder 210 illustrates an example of a tool holder configured to receive fluid through a center of the tool holder, and to releaseably couple the chip removal device 201. In this case, the fluid is supplied down the center of the machine tool spindle. Accordingly, the tool holder 210 has a retention knob 211 with a central opening 212 and a central opening 213 through a main body portion 214 of the tool holder 210 that allows fluid to pass through the tool holder 210 to a cutting tool. This construction can also supply fluid to the chip removal device 201 upon attachment to clean chips from a workpiece. In some machine tools, fluid is configured to pass through a spindle to a flange 215 of the tool holder. Accordingly, some tool holders are configured to receive fluid at a flange inlet port (not shown) and have openings and fluid conduits to fluidly couple the flange inlet to the central opening 213 for delivery of the fluid to a cutting tool.

The chip removal device 201 can be configured to receive fluid from a typical TSC tool holder, as commonly known in the art, or any other suitable type of tool holder. Thus, in one aspect, the chip removal device 201 can have a main fluid channel 221 with an opening or inlet port 222 in fluid communication with the central opening 213 of the tool holder 210 to receive pressurized fluid from the machine tool, such as via the tool holder 210. The chip removal device 201 can also have one or more fluid delivery channels 230a-b, 231a-b, 232, 233 in fluid communication with the main fluid channel 221. Multiple fluid delivery channels can be included to direct fluid in different directions. The fluid delivery channels 230a-b, 231a-b, 232, 233 can be in any suitable orientation relative to an axis of rotation 205 of the spindle. For example, outlets of the fluid delivery channels 230a, 231b can be configured to direct fluid in a direction parallel to the axis 205, and outlets of the fluid delivery channels 230b, 231a, 232, 233 can be configured to direct fluid in directions non-parallel or transverse to the axis 205. The directions of the fluid delivery channel outlets can be configured to direct coolant in any suitable direction to facilitate cleaning chips from a workpiece.

The chip removal device 201 can also include one or more valves 240-243 associated with the fluid delivery channels 230a-b, 231a-b, 232, 233 to selectively allow fluid passage from the main fluid channel 221 to the fluid delivery channels. In one aspect, one or more of the valves 240-243 can be configured as check valves, which can be actuated by varying fluid pressure and/or spindle rotational speed to control delivery of fluid from the fluid delivery channels 230a-b, 231a-b, 232, 233. For example, the valve 240 associated with the fluid delivery channels 230a-b can be configured as a check valve that is normally open. The valve 240 can be of any suitable configuration. In one embodiment, the valve 240 can include an orifice 250, a movable plug 260 to block the orifice 250, and a spring 270 acting on the plug 260. The spring 270 can bias the plug 260 away from the orifice 250, such that the valve 240 is normally open. On the other hand, the valves 241-243 associated with the fluid delivery channels 231a-b, 232, 233 can be configured as check valves that are normally closed. The valves 241-243 can be of any suitable configuration. In one embodiment, each of the valves 241-243 can include an orifice 251-253, a movable plug 261-263 to block the respective orifices 251-253, and a spring 271-273 acting on the respective plugs 261-263. The springs 271-273 can bias the plugs 261-263 toward the respective orifices 251-253, such that the valves 241-243 are normally closed. A plug can have any suitable configuration. For example, the plugs 260-263 illustrated in FIG. 2 have ball configurations, which may fit into cup-shaped orifice openings formed in the chip removal device 201.

In one aspect, multiple fluid delivery channels can be associated with a single valve, such that the valve can control fluid flow for all associated channels. For example, the fluid delivery channels 230a-b are associated with the valve 240, and the fluid delivery channels 231a-b are associated with the valve 241. Outlets of the fluid delivery channels 230a-b are in different directions from one another, and outlets of the fluid delivery channels 231a-b are in different directions from one another. Thus, a single valve can control fluid flow in multiple directions at once.

In one aspect, movement of the plugs 260-263 for a normally open or a normally closed valve can be constrained to be in a direction parallel or non-parallel to the axis of rotation 205 of the spindle. For example, movement of the plug 260 can be constrained to be in a direction parallel to the axis of rotation 205 of the spindle. Because the plug 260 does not move radially outward or inward relative to the axis 205, the valve 240 may be actuated only by fluid pressure acting on the plug 260 independent of rotational speed. Although the plug 260 is located on the axis 205, it should be recognized that a plug constrained to move in a direction parallel to the axis of rotation 205 can be located off-axis, such as radially outward from the axis 205. In another example, movement of the plugs can be constrained to be in a direction non-parallel to the axis of rotation 205 of the spindle. Because the plugs 261-263 move radially outward or inward relative to the axis 205, the valves 241-243 may be actuated by fluid pressure acting on the plugs 261-263 as well as rotation of the spindle about the axis 205, which causes centrifugal force to act on the plugs 261-263, thus causing them to displace.

In one aspect, the spring rates for the springs 270-273 can be selected, such that particular valves 240-243 open at or above certain fluid pressures and/or rotational speeds, which can be controlled by a program and coordinated with tool position relative to certain features of a workpiece. For example, the spring rates of the springs 270-273 can be different from one another to facilitate sequential actuation of the respective valves 240-243 (e.g., with increasing fluid pressures, or with increasing rotational speeds of the spindle) to achieve desired fluid delivery directions for cleaning chips from a workpiece. In another aspect, the preload of the springs 270-273 can be selected, such that particular valves 240-243 open at or above certain fluid pressures and/or rotational speeds. For example, the preload of the springs 270-273 can be different from one another to facilitate sequential actuation of the respective valves 240-243 to achieve desired fluid delivery directions for cleaning chips from a workpiece.

In a particular aspect, the preload of one or more of the springs 270-273 can be adjustable to achieve desired directed fluid delivery performance. For example, the springs 271-273 interface with spring seats 281-283 that can be movable relative to the respective orifices 251-253 to adjust preload of the springs. The spring seats 281-283 can be movably adjustable in any suitable manner, such as via threaded interfaces (not shown) with a body portion 223 of the chip removal device 201. The spring seats 281-283 can include a torque interface (e.g., a slot, hexagonal-shaped interior flat surfaces, star-shaped interior surfaces, etc.) to couple with a tool (e.g., a flat-head screw driver, an Allen key, a star bit or screwdriver, etc.) for rotating the spring seats and adjusting position along the threaded interfaces with the body portion 223. In some embodiments, a spring seat can be located in a fluid delivery channel, such that the spring seat is in the fluid flow path. For example, the spring seat 281 is located in the fluid delivery channel 231a, and the spring seat 282 is located in the fluid delivery channel 232. Such spring seats 281, 282 can include respective openings or ports 291, 292 to facilitate passage of fluid through the spring seats. Thus, the performance of the valves 240-243 can be adjusted by utilizing springs 270-273 with appropri-ate spring rates and/or setting appropriate preloads to achieve fluid flow from certain fluid delivery channels by varying fluid pressure and/or rotational speed. A fluid delivery channel can be "deactivated" or disabled, for example, by inserting a stopper (not shown) in the channel, such as by utilizing a threaded interface.

The chip removal device 201 can provide a fluid delivery nozzle that can change the angle (i.e., angle of attack) or direction of fluid delivery to suit the geometry of a given workpiece by varying fluid pressure and/or spindle rotational speed (e.g., rpm). For example, an operator could go from a direct 90° spray with a stationary spindle to a 45° spray to a grazing 0° spray by changing or varying the spindle speed based on the need relative to the geometry of the part. In addition, the ability to direct fluid to different locations with a single tool can save valuable tool space in a tool carriage.

Figure 3A:
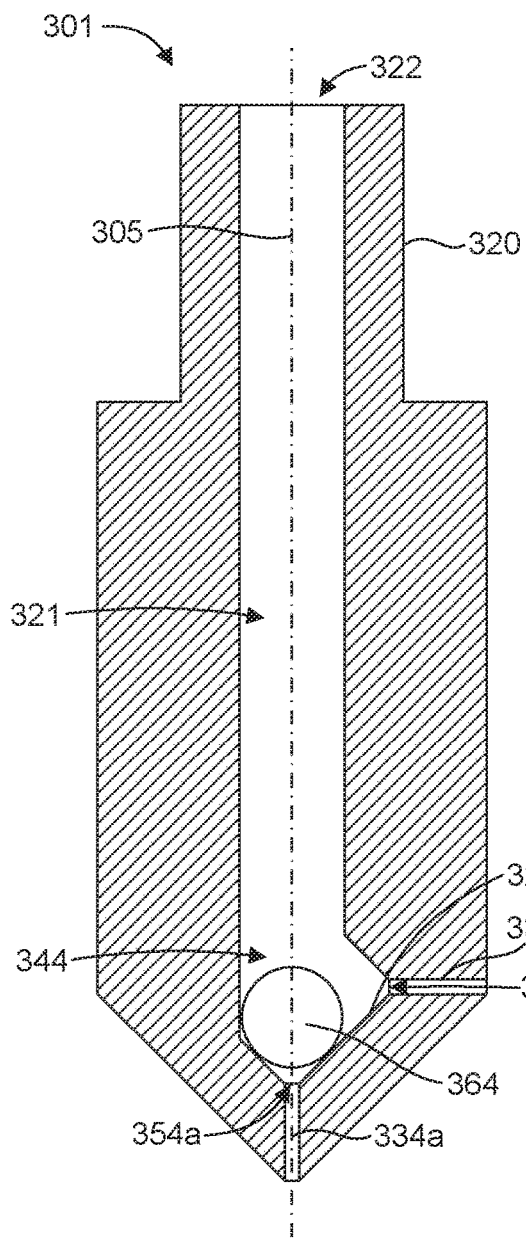
FIG. 3A is a cross-sectional illustration of a chip removal device in accordance with another example of the present disclosure with a valve plug in a first position.
Figure 3B:
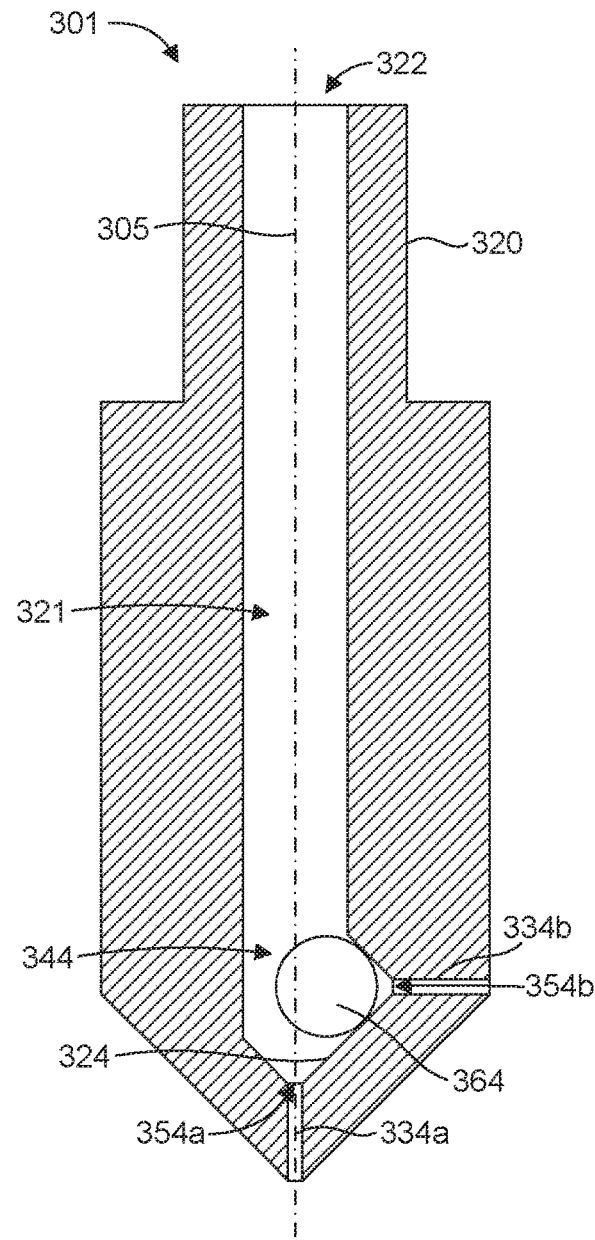
FIG. 3B is a cross-sectional illustration of the chip removal device of FIG. 3A with the valve plug in a second position.

FIGS. 3A and 3B illustrate cross-sections of a chip removal device 301 in accordance with another example of the present disclosure. As with the chip removal device 201 discussed above, the chip removal device 301 can include a coupling interface 320, such as a shank, to couple with a rotatable spindle of a machine tool. The chip removal device 301 can have a main fluid channel 321 with an opening or inlet port 322 to receive pressurized fluid from the machine tool, such as via a tool holder. The chip removal device 301 can also have one or more fluid delivery channels 334a-b in fluid communication with the main fluid channel 321 to direct fluid in different directions.

In this case, the chip removal device 301 includes a single valve 344 that alternates fluid passage from the main channel 321 to the fluid delivery channels 334a-b. For example, the valve 344 can have a plug 364 that is movable from a position blocking an orifice 354a of the fluid delivery channel 334a (FIG. 3A) to a position blocking an orifice 354b of the fluid delivery channel 334b (FIG. 3B). The plug 364 can be movable between the alternate channel orifice blocking positions by varying rotational speed of the spindle about an axis 305. For example, minimal or no rotational speed can allow gravity to force the plug 364 into the bottom orifice 354a, which directs the fluid from the main fluid channel 321 into the fluid delivery channel 334b. Increasing rotational speed can cause centrifugal force to move the plug 364 up a ramp surface 324 into the side orifice 354b, which directs the fluid from the main fluid channel 321 into the fluid delivery channel 334a. Decreasing rotational speed allows the plug 364 to move under the influence of gravity to the position blocking the bottom orifice 354a. Thus, fluid delivery direction can be controlled by adjusting spindle rotational speed.

In accordance with one embodiment of the present invention, a method for removing chips from a workpiece is disclosed. The method can comprise coupling a machine tool chip removal device to a rotatable spindle of a machine tool for rotation about an axis at a rotational speed. The method can also comprise providing pressurized fluid from the machine tool to a main fluid channel of the machine tool chip removal device, the main fluid channel being in fluid communication with first and second fluid delivery channels to direct fluid in different directions, and one or more valves are associated with the first and second fluid delivery channels to selectively allow fluid passage from the main fluid channel to the fluid delivery channels. The method can further comprise positioning the machine tool chip removal device relative to a workpiece. Additionally, the method can comprise directing fluid onto the workpiece in one or more directions by varying at least one of fluid pressure and rotational speed to actuate the one or more valves. In one aspect, the method can further comprise moving the machine tool chip removal device along a tool path about the workpiece while directing fluid onto the workpiece. It is noted that no specific order is required in this method, though generally in one embodiment, these method steps can be carried out sequentially.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A machine tool chip removal device, comprising:
a spindle coupling interface to couple with a rotatable spindle of a machine tool to facilitate rotation of the machine tool chip removal device about an axis at a rotational speed;
a main fluid channel with an opening to receive pressurized fluid from the machine tool;
a first fluid delivery channel and a second fluid delivery channel to direct fluid in different directions, each fluid delivery channel in fluid communication with the main fluid channel; and
one or more valves associated with the first and second fluid delivery channels, respectively, wherein the one or more valves are actuatable by varying the rotational speed of the machine tool chip removal device to selectively allow fluid passage from the main fluid channel to the first and second fluid delivery channels, wherein the one or more valves each comprise an orifice, a movable plug configured to block the orifice, and a spring acting on the plug to bias the plug relative to the orifice.

2. The machine tool chip removal device of claim 1, wherein the one or more valves are normally open.

3. The machine tool chip removal device of claim 1, wherein the spring acts on the plug to bias the plug away from the orifice.

4. The machine tool chip removal device of claim 1, wherein movement of the plug is in a direction parallel to the axis such that the one or more valves are actuated only by fluid pressure acting on the plug, respectively.

5. The machine tool chip removal device of claim 1, wherein an outlet of the first fluid delivery channel is configured to direct fluid in a direction parallel to the axis.

6. The machine tool chip removal device of claim 1, wherein the one or more valves are normally closed.

7. The machine tool chip removal device of claim 1, wherein the spring acts on the plug to bias the plug toward the orifice.

8. The machine tool chip removal device of claim 1, wherein movement of the plug is in a direction non-parallel to the axis such that the valve is actuated at least in part by centrifugal force acting on the plug.

9. The machine tool chip removal device of claim 1, wherein an outlet of the first fluid delivery channel is configured to direct fluid in a direction non-parallel to the axis.

10. The machine tool chip removal device of claim 1, wherein a preload of the spring is adjustable.

11. The machine tool chip removal device of claim 1, wherein the spring interfaces with a spring seat that is movable relative to the orifice to adjust preload.

12. The machine tool chip removal device of claim 1, wherein the spring seat comprises an opening to facilitate passage of fluid therethrough.

13. The machine tool chip removal device of claim 1, wherein the one or more valves comprises a first valve and a second valve.

14. The machine tool chip removal device of claim 13, wherein the springs of the first and second valves, respectively, have different spring rates.

15. The machine tool chip removal device of claim 13, wherein the springs of the first and second valves, respectively, have different preloads.

16. A machine tool chip removal system, comprising:
a machine tool; and
a machine tool chip removal device operably coupled to the machine tool, the machine tool chip removal device having
a coupling interface to couple with a rotatable spindle of the machine tool to facilitate rotation of the machine tool chip removal device about an axis at a rotational speed,
a main fluid channel with an opening to receive pressurized fluid from the machine tool,
a first fluid delivery channel and a second fluid delivery channel to direct fluid in different directions, each fluid delivery channel in fluid communication with the main fluid channel, and
one or more valves associated with the first and second fluid delivery channels, respectively, wherein the one or more valves are actuatable by varying the rotational speed of the machine tool chip removal device to selectively allow fluid passage from the main fluid channel to the fluid delivery channels,
wherein the one or more valves each comprise an orifice, a movable plug configured to block the orifice, and a spring acting on the plug to bias the plug relative to the orifice.

17. The system of claim 16, wherein the machine tool comprises a mill, a lathe, or a combination thereof.

18. The system of claim 16, wherein the pressurized fluid comprises at least one of a gas and a liquid.

* * * * *